(12) United States Patent
Balle et al.

(10) Patent No.: US 7,154,479 B2
(45) Date of Patent: Dec. 26, 2006

(54) PRECISION RESOLUTION

(75) Inventors: Henrik Balle, Copenhagen (DK); Lone Stagsted, Hellerup (DK); Janne Jakobsen, Brenshej (DK); Christian Saxe Knudsen, Copenhagen (DK)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 10/449,036

(22) Filed: May 29, 2003

(65) Prior Publication Data

US 2004/0239692 A1 Dec. 2, 2004

(51) Int. Cl.
*G09G 5/00* (2006.01)
(52) U.S. Cl. ............... 345/169; 345/156; 200/5 R; 200/11 R; 455/566.1; 455/575.1
(58) Field of Classification Search ........ 345/156–169; 200/5 R, 6 A, 11 R, 8 R; 348/734; 463/37–38; 455/556.1, 556.2, 575.1, 575.2
See application file for complete search history.

(56) References Cited

U.S. PATENT DOCUMENTS

| | | | | |
|---|---|---|---|---|
| 4,365,349 A * | 12/1982 | Ogita et al. | .............. | 455/192.2 |
| 4,481,512 A * | 11/1984 | Tscheulin et al. | ...... | 340/825.25 |
| 4,698,626 A * | 10/1987 | Sato et al. | .................. | 345/166 |
| 4,866,542 A * | 9/1989 | Shimada et al. | .............. | 386/69 |
| 5,438,331 A * | 8/1995 | Gilligan et al. | ............... | 341/35 |
| 5,530,455 A | 6/1996 | Gillick et al. | ................ | 345/163 |
| 5,808,602 A | 9/1998 | Sellers | .................. | 345/157 |
| 5,818,437 A | 10/1998 | Grover et al. | .............. | 345/326 |
| 5,825,353 A * | 10/1998 | Will | ............................. | 345/684 |
| 5,915,228 A * | 6/1999 | Kunihiro et al. | .......... | 455/575.1 |
| 5,963,195 A * | 10/1999 | Gregg et al. | ................. | 345/159 |
| 6,097,964 A | 8/2000 | Nuovo et al. | ............... | 455/550 |
| 6,208,342 B1 * | 3/2001 | Mugura et al. | ............. | 714/810 |
| 6,232,959 B1 | 5/2001 | Pedersen | .................... | 345/161 |
| 6,246,862 B1 | 6/2001 | Grivas et al. | ................. | 455/90 |
| 6,297,795 B1 * | 10/2001 | Kato et al. | ................... | 345/684 |
| 6,337,694 B1 | 1/2002 | Becker et al. | ............. | 345/684 |
| 6,392,640 B1 | 5/2002 | Will | ........................... | 345/184 |
| 6,396,006 B1 | 5/2002 | Yokoji et al. | .................. | 200/4 |
| 6,487,424 B1 | 11/2002 | Kraft et al. | ................. | 455/566 |
| 6,534,730 B1 * | 3/2003 | Ohmoto et al. | ................ | 200/4 |
| 6,865,718 B1 * | 3/2005 | Alessandro | ................. | 715/786 |
| 2002/0063684 A1 | 5/2002 | Tran | ........................... | 345/156 |
| 2003/0001865 A1 * | 1/2003 | Hirose et al. | ............... | 345/619 |
| 2003/0076301 A1 | 4/2003 | Tsuk et al. | | |

FOREIGN PATENT DOCUMENTS

| | | |
|---|---|---|
| EP | 0 585 730 | 8/1993 |
| EP | 0 755 142 A2 | 1/1997 |
| EP | 0 930 760 A2 | 7/1999 |

(Continued)

OTHER PUBLICATIONS

Rotary cell-phone keypad, Bristolz, Feb. 15, 2002, pp. 1-3,(http//www.halfbakery.com/idea/Rotary_20cell-phone_20keypad).

*Primary Examiner*—Lun-yi Lao
(74) *Attorney, Agent, or Firm*—Perman & Green, LLP (57) ABSTRACT

A mobile communication apparatus comprises a processor means and an interface. The interface comprises a display and a input means, which comprises a rotating input means arranged to provide a angular movement signal in accordance with an angular movement of the rotating input means. The processor means is adapted to generate a selectable number of counts from said angular movement signal.

18 Claims, 9 Drawing Sheets

FOREIGN PATENT DOCUMENTS

| | | |
|---|---|---|
| EP | 1 026 713 A1 | 8/2000 |
| EP | 1 150 242 A2 | 10/2001 |
| EP | 1 391 806 A1 | 2/2004 |
| WO | WO 00/59181 A1 | 10/2000 |
| WO | WO 02/39712 A2 | 5/2002 |
| WO | WO 02/095564 A1 | 5/2002 |
| WO | WO 02/091160 A1 | 11/2002 |
| WO | WO 03/036642 A2 | 5/2003 |

* cited by examiner

PRECISION RESOLUTION

FIELD OF THE INVENTION

The present invention relates to a mobile communication apparatus having a rotating input means, a method for inputting data through said rotating input means, and a computer program for carrying out said method.

BACKGROUND OF THE INVENTION

WO 02/39712 A2, which is hereby incorporated by reference, discloses an image control system for controlling a menu on a display in a television system. The menu comprises a plurality of simultaneously displayed menu items. A selector is arranged to select an item from the menu. A user input device comprises a control device to generate a control signal to move the selector relative to the menu. Further, a rotatable control is disclosed, wherein rotation of the control causes a corresponding rotation of the menu. Alternatively, a cursor is viewed on the menu screen that follows the menu items as a user operates the control device.

WO 02/39712 A2 further discloses applicability to mobile telephone menus. The menu on a screen of a telephone handset is shown as a two-dimensional circle. A rotary dial is provided on the front face of the handset. The handset has the usual features of a mobile telephone with the addition of the rotary dial positioned on the front face. On activation of the menu of the mobile telephone handset, the dial operates as the control device, described above with reference to the television system. Of course, there is no transmission of a remote control signal as in the television, but rather the signal is coupled to the display within the handset. To select an item from the menu a user rotates the dial until either the cursor has moved to be associated with the desired menu item or the menu has rotated so that the desired item has come into alignment with a selector region on the screen of the mobile telephone handset.

A mobile communication apparatus is used for a plurality of applications, and therefore require a high grade of adaptability for feasible handling. The solution presented in WO 02/39712 is adapted for handling a quite simple and static menu. As mobile telephone handsets include several applications, and the number of applications is increasing, this rotary input device will not be sufficient for a modern mobile communication apparatus.

U.S. Pat. No. 6,337,694 B1, which is hereby incorporated by reference, discloses a method and a system for variable speed scrolling through a viewable object within a data processing system, such as a computer, a television, a kiosk display, or hand-held digital product. In a large viewable object, such as a document, scrolling can be obtained by continuous selection of scroll buttons or dragging of a slider. Scrolling speed can then vary with the content of the information being scrolled.

This feature is advantageous when scrolling documents, but gives no advantages for other applications. Further, in a mobile communication apparatus, with its limitations in size and processing power, and requirements on power consumption and one hand operation, there is a need for an improved user interaction.

It is quite common for arcade games to have input means that can be set to function in two different modes, one analogue and one digital left/right mode. The digital mode is used for scrolling through letter strings or choosing different gaming options and the analogue mode is used for the actual steering/game control. Further, most gaming control input means have a middle position.

As a mobile communication apparatus is used for both gaming and communication services, as well as using it as a personal digital assistant (PDA), there is a need for providing a user interface that will be feasible for all these applications. A classic game control is good for gaming, but is not the best for controlling functions in a PDA, and a classic mobile telephone keyboard is not the best for gaming. Therefore, there is a need for providing an improved user interface.

SUMMARY OF THE INVENTION

It is an object of the present invention to provide a rotating input means for a mobile communication apparatus with a selectable number of counts for a given angular movement.

The term "counts" should in this context be construed as a discrete representation of a rotating movement. The count may represent angular movement of the rotating input means, that is, a full or parts of a rotation of the rotating input means.

It is another object of the present invention to provide a method for selecting a number of counts for a given angular movement of a rotating input means.

It is yet another object of the present invention to provide a computer program product for selecting a number of counts for a given angular movement of a rotating input means.

The present invention is based on the understanding that a mobile communication apparatus may execute a plurality of applications, and requires a feasible interface for controlling said plurality of applications. Further, the interface of a mobile communications apparatus is crucial, due to the small size of the equipment, this even more since a mobile communication apparatus usually is handled only by one hand, on the move, or while driving a car.

A particular advantage of the present invention is the provision of the rotating input means adapted for every situation thus providing an user friendly mobile communication apparatus.

A particular feature of the present invention relates to dynamic selection of number of counts for a given angular movement of the rotating input means. The user will then experience easier handling of the mobile communication apparatus, since by defining a particular translation of an angular movement of the rotating input means into a number of counts the user will experience a change in resolution of the angular movement in accordance with a particular function.

The above objects, advantage and feature together with numerous other objects, advantages and features, which will become evident from below detailed description, is obtained according to a first aspect of the present invention by a mobile communication apparatus comprising processor means and an interface, the interface comprising a display and a input means, the input means comprising a rotating input means arranged to provide a angular movement signal in accordance with an angular movement of said rotating input means, and the processor means being adapted to generate a selectable number of counts from said angular movement signal.

In the mobile communication apparatus according to the first aspect of the present invention, the angular movement signal may comprise a signal pattern such as a pulse, a sequence of pulses, a digital signal, an analogue signal, or any combination thereof.

In the mobile communication apparatus according to the first aspect of the present invention, the processing means may be adapted to generate said selectable number of counts in accordance with instructions received from an application to be executed by said processor means, user interaction, or any combination thereof. The application may comprise a calendar, a game, a media player, a web browser, a phone book, a messaging service, or an FM-radio, or any combination thereof.

These features may improve handling of the mobile communication apparatus for any application, since the perceived resolution varies depending on the application. E.g., when symbols are to be chosen, scrolling through a text, or selecting from a long list, the resolution may be selected to be high. However, the user may select a lower resolution, which may be beneficiary for disabled people, or when handling the mobile communication apparatus wearing gloves. When playing a game, the resolution may be preferred to be low. However, the user may want to select a higher resolution, which may be beneficiary to skilled gamers.

The angular movement signal may comprise electric, optical, or magnetic signals, or any combination thereof.

This will enable an improved design of a mobile communication apparatus, since hardware and software of the apparatus may be adapted to any type of mobile communication apparatus.

The mobile communication apparatus according to the first aspect of the present invention may further comprise speed monitoring means adapted to monitor a angular movement speed of the rotating input means and to generate angular movement speed data. The processor means may be adapted to receive the angular movement speed data from the speed monitoring means and to translate the angular movement speed into a processing action. The processing action may comprise scrolling, and wherein the processor means translates low angular movement speed to scroll up/down and high angular movement speed to page up/down. The processing action may also comprise data flipping, and wherein the processor means translates low angular movement speed to next/previous data and high angular movement speed to fast forward/reverse. The processing action may also comprise scanning, and wherein the processor means translates low angular movement speed to manual search and high angular movement speed to automatic search.

This may further improve handling of the mobile communication apparatus. The monitoring of the angular movement speed may provide a more intuitive user interface. For example, the feature may be utilized in an FM-radio application, wherein the translation of high speed angular movement of the rotating input means input means is automatic search for a radio station, and the translation of low speed angular movement of said rotating input means input means is manual search for a radio station.

Further, the feature may be utilized in a media player application, wherein the translation of high speed angular movement of the rotating input means input means is next/previous media item, and the translation of low speed angular movement of said rotating input means input means is fast forward/reverse within a present media item.

Furthermore, the feature may be utilized in an application enabling scrolling, wherein the translation of low speed angular movement of the rotating input means input means may then be scroll up/down, and/or the translation of a high speed angular movement of the rotating input means may then be page up/down.

The input means according to the first aspect of the present invention may further comprise a selection means for selecting an item marked on the display, which selection means is arranged to change the selection of a marked item by ignoring angular movement of the rotating input means during a predetermined time period before actuation of the selection means.

This may correct for unintentional angular movement while actuating selection means, and is especially feasible when the resolution is high.

The mobile communication apparatus according to the first aspect of the present invention may comprise a cellular telephone, a personal digital assistant, or a videophone, or any combination thereof.

The above objects, advantage and feature together with numerous other objects, advantages and features, which will become evident from below detailed description, is obtained according to a second aspect of the present invention by a method for inputting data in a mobile communication apparatus comprising generating a angular movement signal upon angular movement of a rotating input means, receiving said angular movement signal by processor means, defining a number of counts for a angular movement of said rotating input means, and generating counts in accordance with said angular movement signal.

The defining of the number of counts according to the second aspect of the present invention may further comprise receiving number data from an application executed by the mobile communication apparatus, or receiving number data from user interaction, or any combination thereof. The number of counts may be defined by an application executed by the mobile communication apparatus, or by user interaction, or any combination thereof.

The method according to the second aspect of the present invention may further comprise monitoring a angular movement speed of the rotating input means and generating angular movement speed data.

The method according to the second aspect of the present invention may further comprise receiving the angular movement speed data and translating the angular movement speed into a processing action. The processing action may comprise any of the examples presented above with reference to the mobile communication apparatus according to the first aspect of the present invention.

The method according to the second aspect of the present invention may further comprise enabling selection of a marked item, and correcting the control signal by disabling count generation during a predetermined time period before actuation of the selection means.

The method according to the second aspect of the present invention may incorporate any features described with reference to the mobile communication apparatus according to the first aspect of the present invention.

The above objects, advantage and feature together with numerous other objects, advantages and features, which will become evident from below detailed description, is obtained according to a third aspect of the present invention by a computer program comprising code adapted to perform the following steps when the program is run on a data-processing system:

generating a angular movement signal upon angular movement of a rotating input means, receiving the angular movement signal by processor means, defining a number of counts for a angular movement of the rotating input means, and generating counts in accordance with the angular movement signal The computer program according to the third aspect of the present invention may comprise further code adapted to perform the method according to second aspect of the present invention when the program is run on a data-processing system.

The computer program according to the third aspect of the present invention may be executed on a mobile communication apparatus according to first aspect of the present invention.

The computer program according to the third aspect of the present invention may incorporate any features described with reference to the mobile communication apparatus according to the first aspect of the present invention and with reference to the method according to the second aspect of the present invention.

BRIEF DESCRIPTION OF THE DRAWINGS

The novel features of the present invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
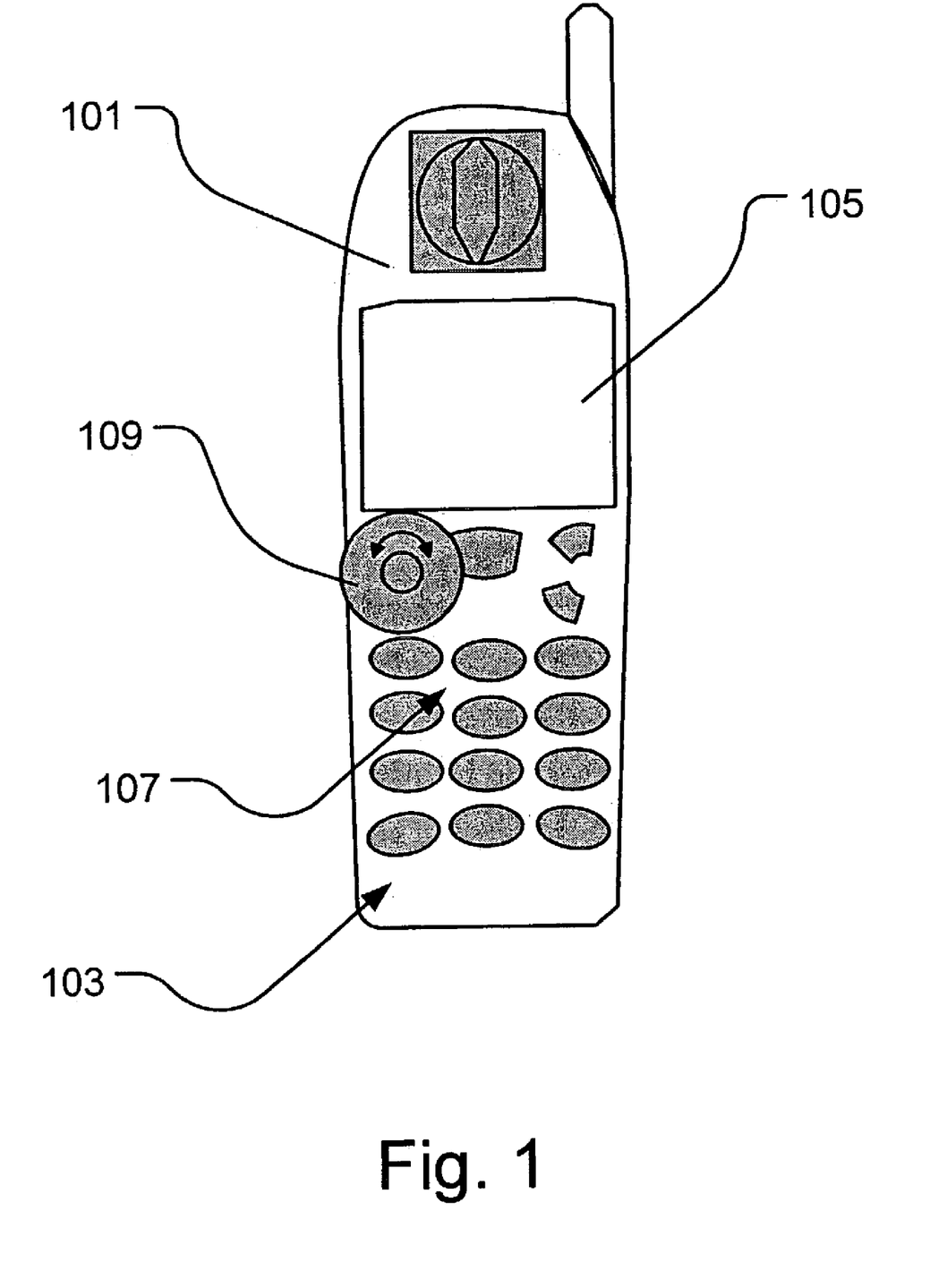
FIG. 1 illustrates a mobile communication apparatus comprising a rotating input means.

FIG. 1 shows a mobile communication apparatus 101 comprising a user interface 103 comprising a display 105 and input means 107, such as a keypad, a touch screen, or a voice control interface, for inputting data. The input means 107 further comprises a rotating input means 109 arranged to provide angular movement signals while a user is rotating the rotating input means 109. The rotating input means 109 is used e.g. for marking an item in a menu presented on the display 105, or for controlling a game application executed by the mobile communication apparatus. A selection means is integrated in the rotating input means 109. The selection means is used for selecting a item marked in the menu or for input to certain functions in the game application. The selection means is actuated by pressing down the center of the rotating input means 109. Alternatively, the selection means is a selection key in any other part of the input means 107.

Figure 2A:
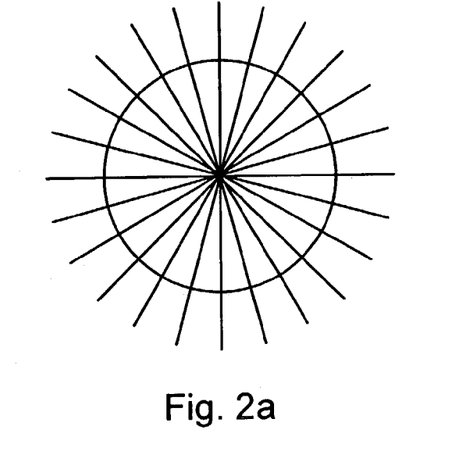
FIGS. 2a–2e illustrate a variable number of counts per turn for a rotating input means.
Figure 2B:
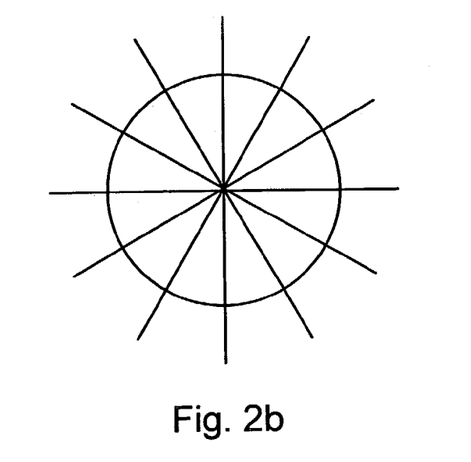
Figure 2C:
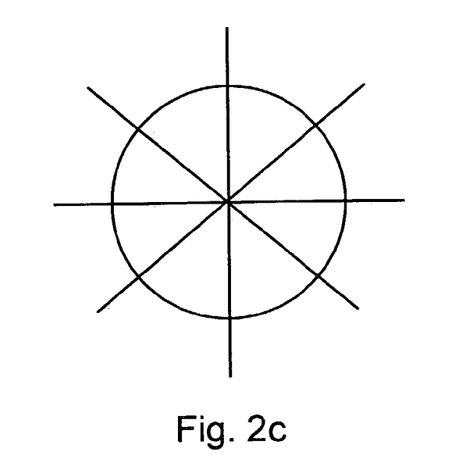
Figure 2D:
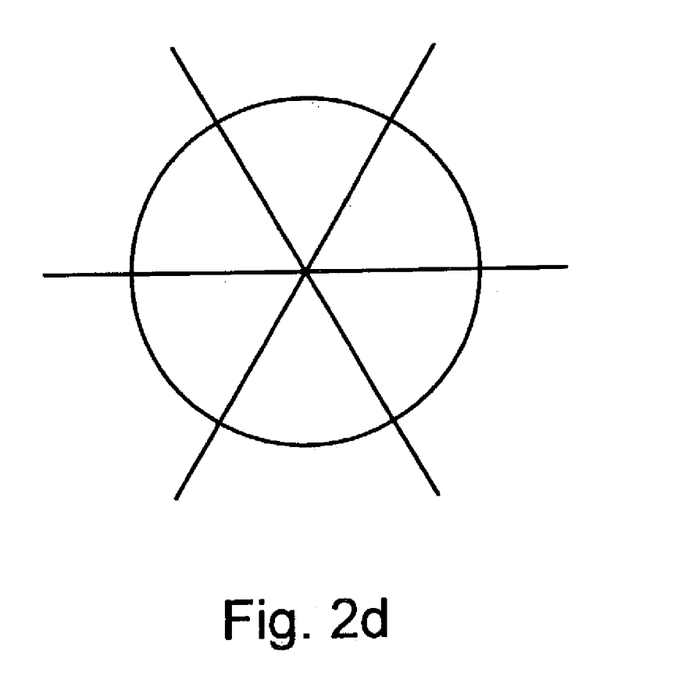
Figure 2E:
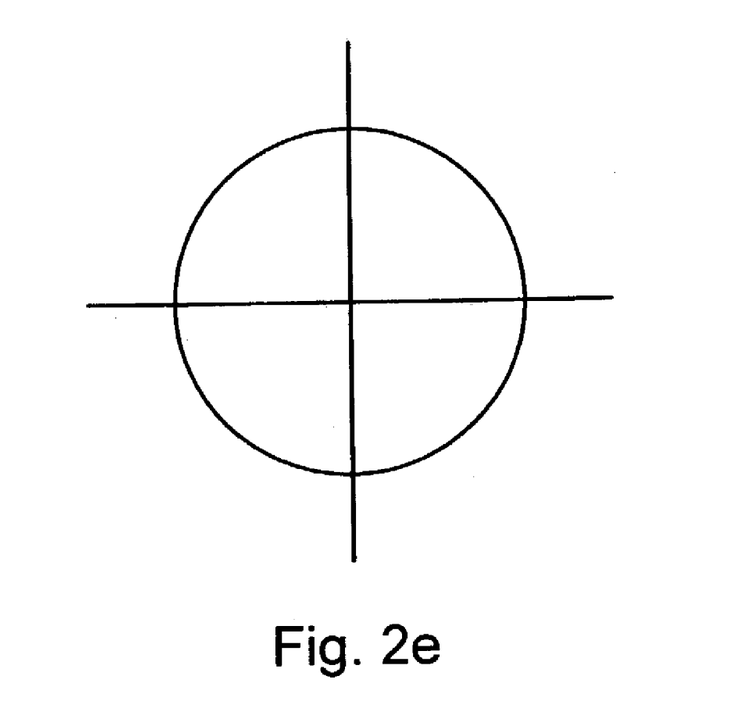

FIGS. 2a–2e illustrate a variable resolution of a rotating input means. As default, the rotating input means will have a predetermined counts per turn. This number is fixed from a hardware point of view, and can be e.g. 8, 12, 15, 24, 27, 45, or any number. The number of counts per turn perceived by the user is equal to this number, or less. For illustrative example, the hardware fixed number of counts per turn for a rotating input means is 24. The perceived number of counts for the user can then be determined as 24 divided by a variable, e.g. 24/1=24 (FIG. 2a), 24/2=12 (FIG. 2b), 24/3=8 (FIG. 2c), 24/4=6 (FIG. 2d), and 24/6=4 (FIG. 2e). Here, 24 counts per turn is the highest resolution and 4 counts per turn represents very low resolution.

Figure 3A:
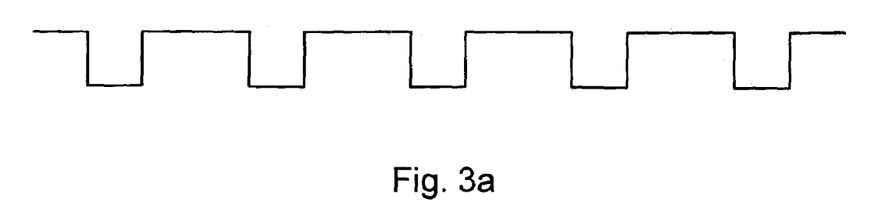
FIGS. 3a–3d illustrate examples of angular movement signals generated when actuating a rotating input means.
Figure 3B:
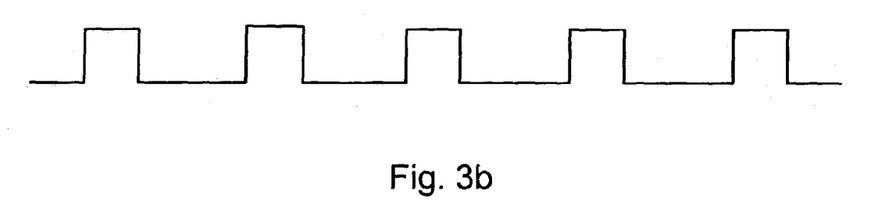
Figure 3C:
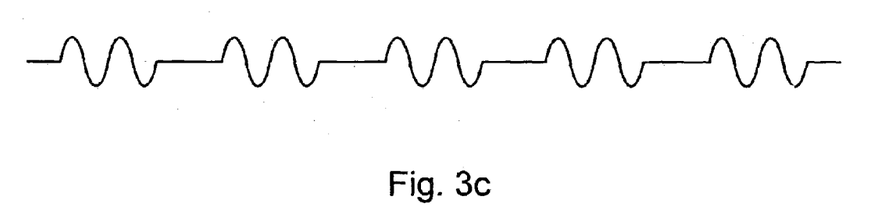
Figure 3D:
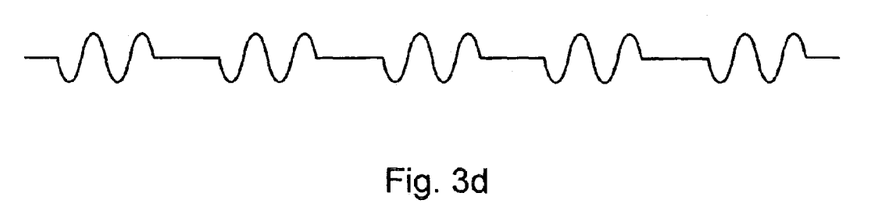

FIGS. 3a and 3b illustrate an example of a angular movement signal generated when actuating the rotating input means. FIG. 3a illustrates the angular movement signal when the rotating input means is rotated clockwise, and FIG. 3b illustrates the angular movement signal when the rotating input means is rotated counter clockwise. As the rotating input means is able to be rotated in either direction, two angular movement signal constellations are needed; one for each direction. FIGS. 3c and 3d illustrate another example of a angular movement signal generated when actuating the rotating input means. FIG. 3c illustrates the angular movement signal when the rotating input means is rotated clockwise, and FIG. 3d illustrates the angular movement signal when the rotating input means is rotated counter clockwise.

The examples illustrated by FIGS. 3a–3d should be construed as examples only, and the angular movement signals can be chosen in any way that is sufficient for any actual components in the mobile communication apparatus.

Alternatively, the resolution varies during an angular movement of the rotating input means. A first count is generated after a certain angular movement, and a second count is generated after a slightly smaller angular movement, and a third count is generated after an even smaller angular movement, and so on. This will give an accelerating movement of a cursor or a game control. This feature preferably work in accordance with instructions received from an application to be executed by said processor means, user interaction, or any combination thereof. From a hardware point of view, the first count is generated after e.g. 4 repeated angular movement signal constellations, the second after 7, the third after 9, the fourth after 10, etc.

Figure 4A:
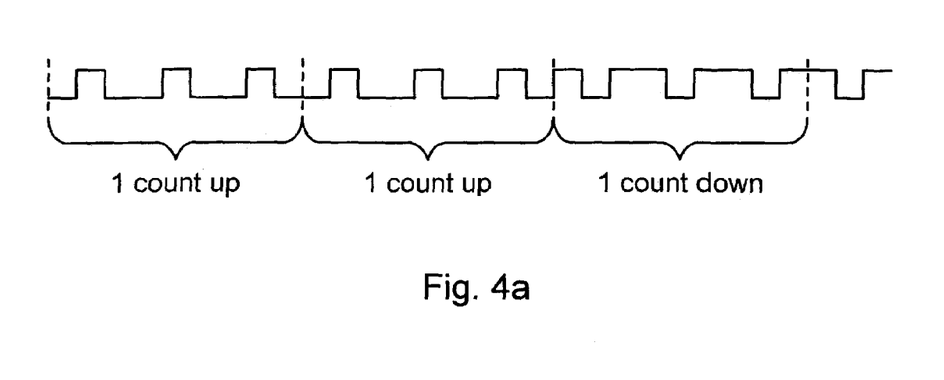
FIGS. 4a–4c illustrate examples of relationships between the angular movement signals illustrated in FIGS. 3a–3d and generation of counts.
Figure 4B:
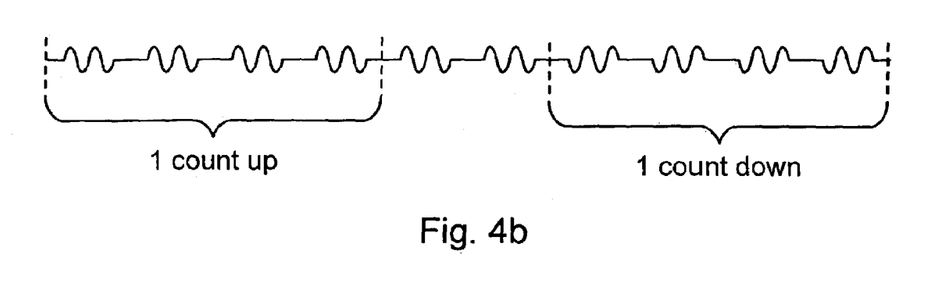
Figure 4C:
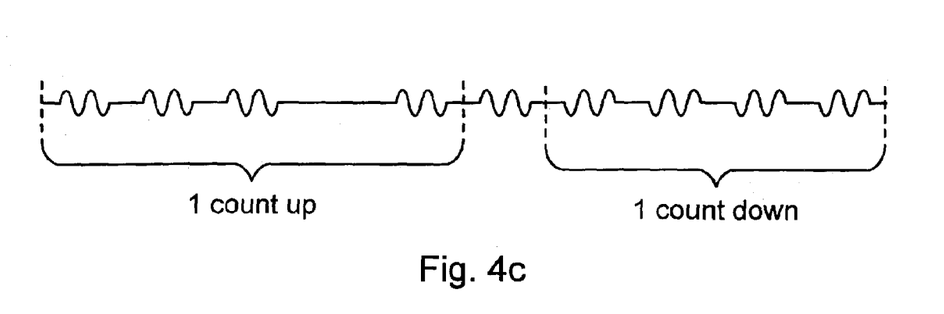

FIG. 4a illustrates an example of a relationship between the angular movement signal generated when actuating the rotating input means, and the generation of counts. In this example, three consecutively repeated signal patterns in the angular movement signal is arranged to generate a count. Depending on the signal constellation of the repeated signal patterns, the count is determined to be up/down. FIG. 4b illustrates another example of a relationship between the signal generated when actuating the rotating input means. Further, FIG. 4c illustrates another example of a relationship between the angular movement signal and generated counts, when the actuation is not continuous. Here, four consecutively repeated signal patterns in a angular movement signal is arranged to generate a count.

Figure 5:
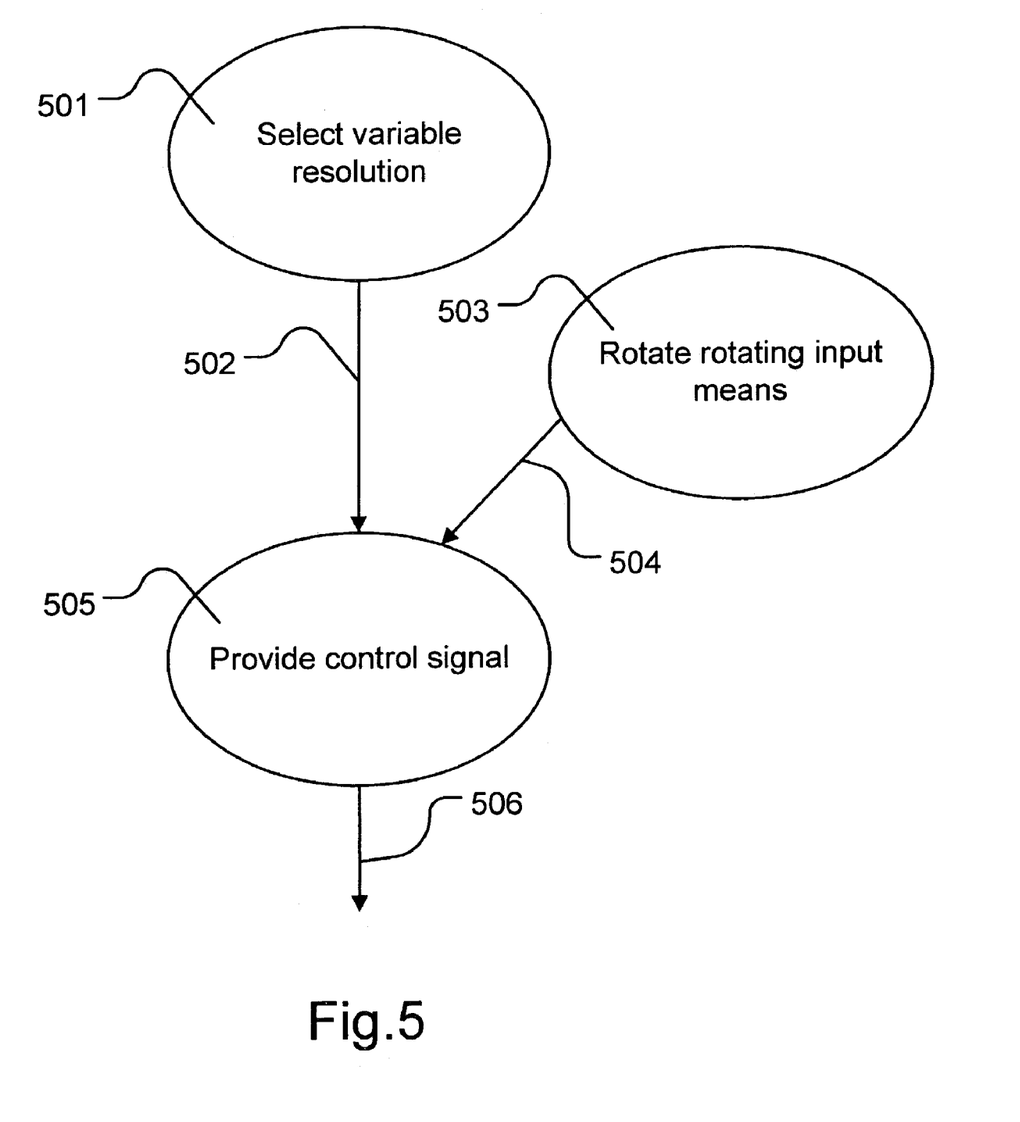
FIG. 5 illustrates interaction between different objects according to a first embodiment of the invention.

FIG. 5 illustrates a method for inputting data comprising selecting a variable resolution 501 of a rotating input means. The rotating input means is rotated 503 by a user to input data, and electric, magnetic, or optical angular movement signals 504, or any combination thereof, are generated in relation to the angular movement. The selected resolution 502 and the generated angular movement signals 504 from the rotating input means are used to provide 505 one or more counts, which are used by the user interface in the mobile communication apparatus for data input. The resolution 502 is denoted by number of counts per turn of the rotating input means, and the resolution 502 is determined by the actual application executed by the processor of the mobile communication apparatus, and/or by user interaction. The resolution can actively be selected by a user, indirectly be selected by a user through determination of the user's actions, or be independent on the user. For example, when symbols are to be chosen, scrolling through a text, or selecting from a long list, the resolution 502 is selected to be high, e.g. 24 counts per turn, determined by the application. However, the user can select a lower resolution 502, which may be beneficiary for disabled people, or when handling the mobile communication apparatus wearing gloves. When playing a game, the resolution 502 are preferred to be low, e.g. 4, or 8 counts per turn of the rotating input means. However, the user may want to select a higher resolution 502, which may be beneficiary to very skilled gamers.

Figure 6:
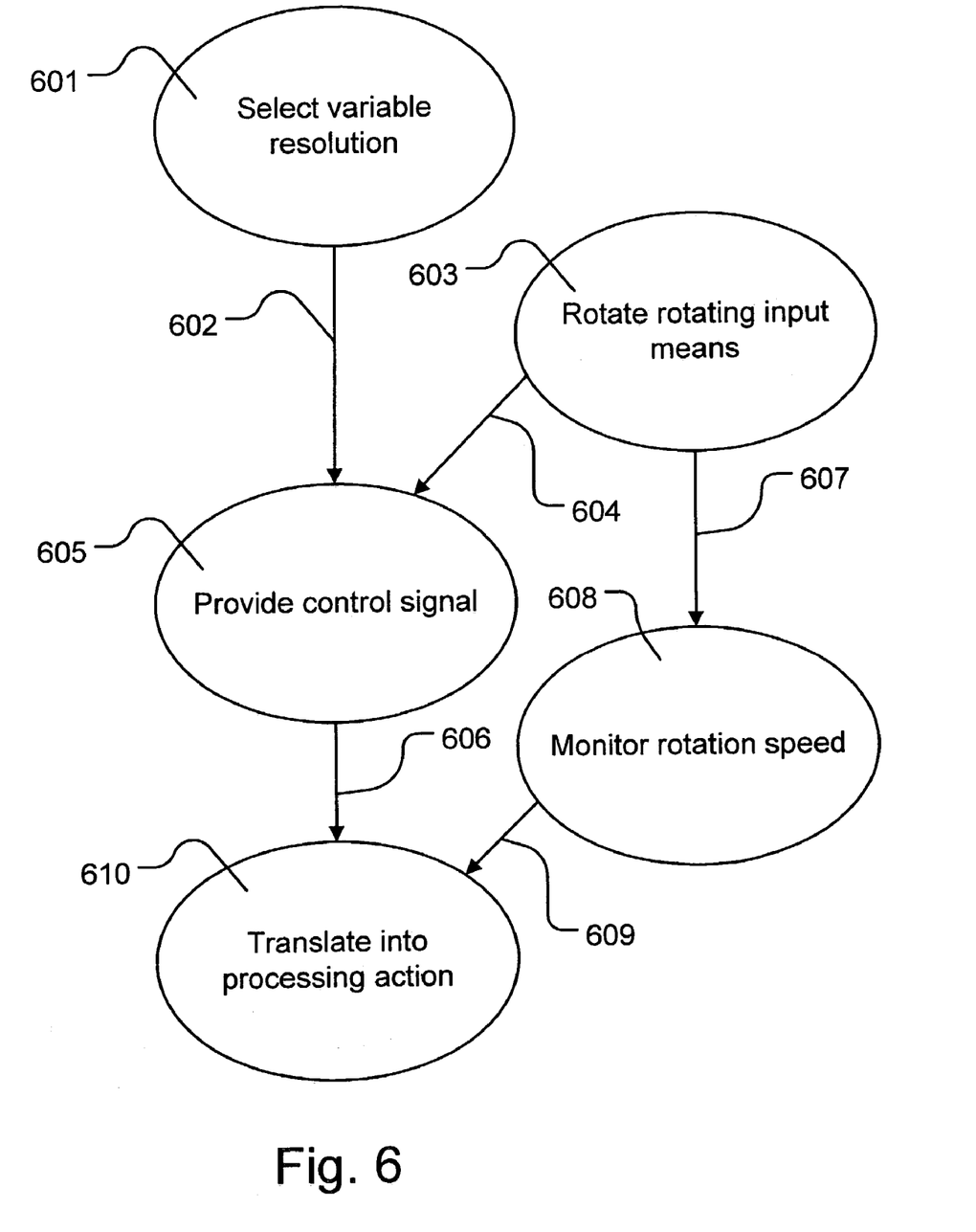
FIG. 6 illustrates interaction between different objects according to a second embodiment of the invention.

FIG. 6 illustrates a method for inputting data comprising selecting a variable resolution 601 of a rotating input means input means. The rotating input means is rotated 603 by a user to input data, and electric, magnetic or optical angular movement signals 604 are generated in relation to the angular movement. The selected resolution 602 and the generated angular movement signals 604 from the rotating input means are used to provide 605 one or more counts. Further, as the rotating input means is rotated 603 by the user, a angular movement speed is monitored 608. The angular movement speed data 609 is translated 610 into a processing action. Thus, a processor means will interpret the input from the rotating input means depending on the angular movement speed data 609, and the interpretation is determined by an application executed by the mobile communication apparatus. For example, a high angular movement speed data will be translated into a processing action comprising automatic search for a radio station if the application is e.g. an FM-radio, and a low angular movement speed as manual tuning. Another example is when high angular movement speed translated into a processing action comprising jump to next/previous media item when the application is a media player, and low angular movement speed is then fast forward/reverse within the present media item. Further, an example is when high angular movement speed is translated into a processing action comprising page up/down, and slow speed is interpreted as scrolling up/down. Further another example is when high angular movement speed is translated into a processing action comprising going to the top/bottom of a list or text, medium speed is translated into a processing action comprising page up/down, and slow speed is translated into a processing action comprising one step up/down in the list or text.

Figure 7:
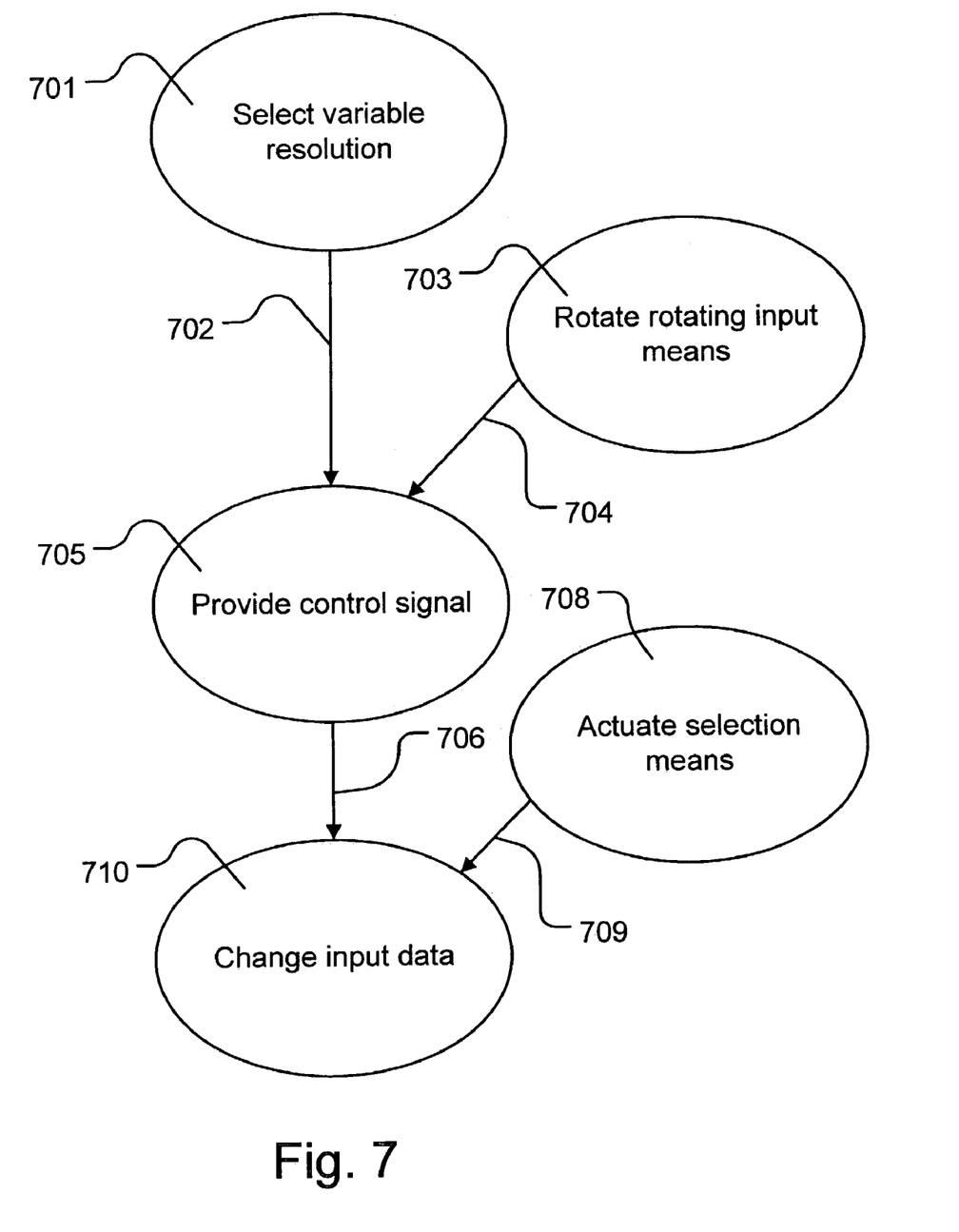
FIG. 7 illustrates interaction between different objects according to a third embodiment of the invention.

FIG. 7 illustrates a method for inputting data comprising selecting a variable resolution 701 of a rotating input means input means. The rotating input means is rotated 703 by a user to input data, and electric, magnetic or optical angular movement signals 704 are generated in relation to the angular movement. The selected resolution 702 and the generated angular movement signals 704 from the rotating input means are used to provide 705 one or more counts, and is used by the user interface in the mobile communication apparatus for data input. Further, a selection means is actuated 708 by a user to select, for example an item from a menu, and an electric, a magnetic or an optical select signal 709 are generated in relation to the actuation. The selection is changed 710 depending on the select signal 709 though disregarding any angular movement 703 of the rotating input means during a predetermined time period before selection 708. This will correct for unintentional angular movement while actuating selection means, and is especially feasible when the resolution is high.

Figure 8:
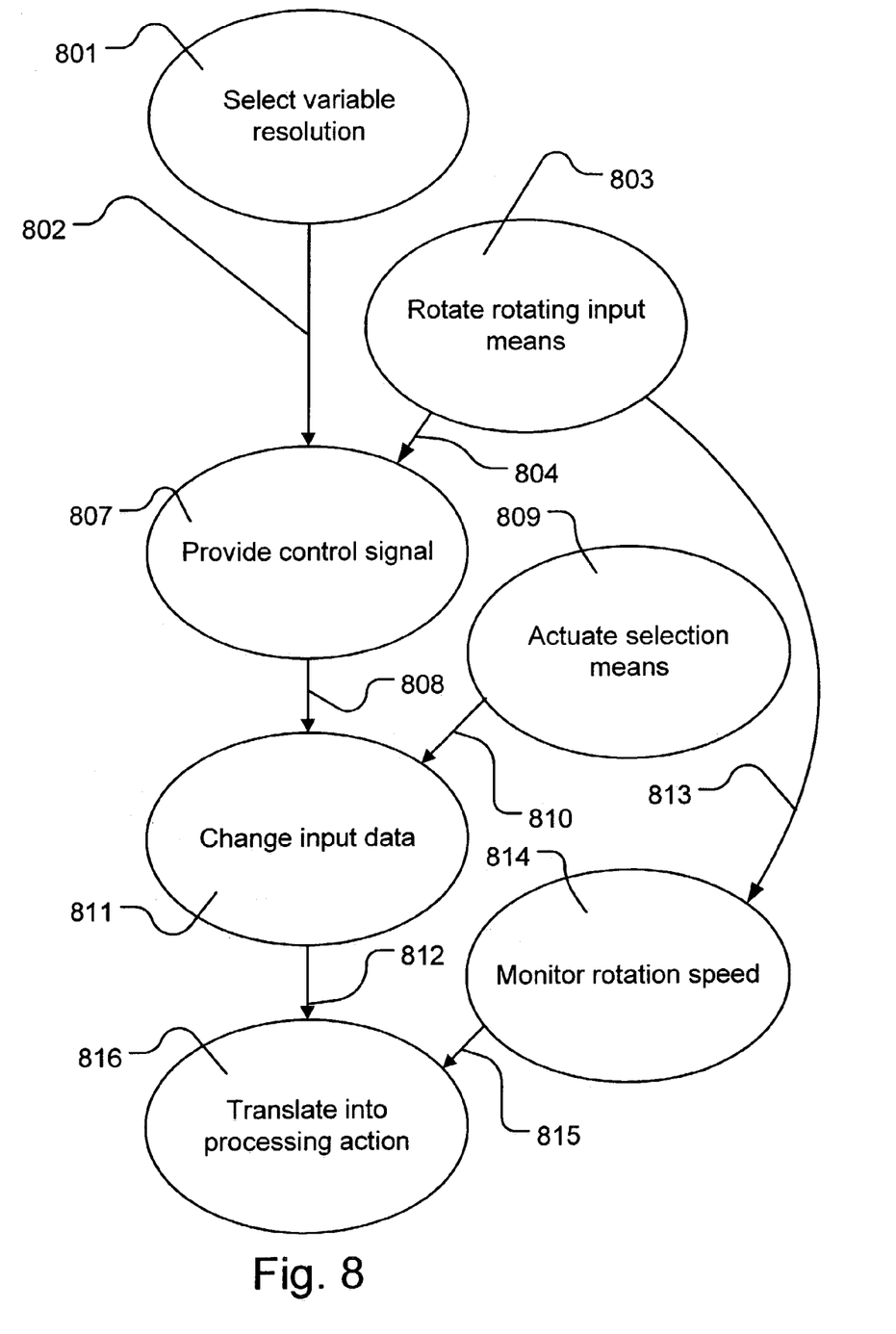
FIG. 8 illustrates interaction between different objects according to a fourth embodiment of the invention.

FIG. 8 illustrates all of the above described features in combination. A variable resolution 802 is selected. As a rotating input means is rotated 803 angular movement signals 804 from a rotating input means are used together with the variable resolution 802 to provide 807 one or more counts. If a selection means is actuated 809, a select actuation signal 810 is generated, and the selection is changed 811 selection 812, which is translated into a processing action 816 based on a monitored 814 angular movement speed 815 and an application executed by a processor means of the mobile communication apparatus.

What is claimed is:

1. Mobile communication apparatus comprising processor means and an interface, said interface comprising a display and an input means, said input means comprising a rotating input means arranged to provide an angular movement signal in accordance with an angular movement of said rotating input means, and said processor means being adapted to generate a selectable number of counts from said angular movement signal by way of a dynamic selection of number of counts for a given angular movement, wherein said input means further comprises a selection means for selecting an item marked, and means for correcting said angular movement signal by disabling count generation during a predetermined time period before actuation of the selection means.

2. Mobile communication apparatus according to claim 1, wherein said angular movement signal comprises a signal pattern such as a pulse, a sequence of pulses, a digital signal, an analogue signal, or any combination thereof.

3. Mobile communication apparatus according to claim 2, wherein said processing means is adapted to generate said selectable number of counts in accordance with instructions received from an application to be executed by said processor means, user interaction, or any combination thereof.

4. Mobile communication apparatus according to claim 3, wherein said application comprises a calendar, a game, a media player, a web browser, a phone book, a messaging service, or an FM-radio, or any combination thereof.

5. Mobile communication apparatus according to claim 1 further comprising speed monitoring means adapted to monitor a angular movement speed of said rotating input means and to generate angular movement speed data.

6. Mobile communication apparatus according to claim 5, wherein said processor means is adapted to receive said angular movement speed data from said speed monitoring means and to translate said angular movement speed into a processing action.

7. Mobile communication apparatus according to claim 6, wherein said processing action comprises scrolling, and wherein said processor means translates low angular movement speed to scroll up/down and high angular movement speed to page up/down.

8. Mobile communication apparatus according to claim 6, wherein said processing action comprises data flipping, and wherein said processor means translates low angular movement speed to next/previous data and high angular movement speed to fast forward/reverse.

9. Mobile communication apparatus according to claim 6, wherein said processing action comprises scanning, and wherein said processor means translates low angular movement speed to manual search and high angular movement speed to automatic search.

10. Mobile communication apparatus according to claim 1, wherein said mobile communication apparatus comprises a cellular telephone, a personal digital assistant, or a videophone, or any combination thereof.

11. Mobile communication apparatus comprising processor means and an interface, said interface comprising a display and an input means, said input means comprising a rotating input means arranged to provide an angular movement signal in accordance with an angular movement of said rotating input means, wherein said input means further comprises a selection means for selecting an item marked on said display, which selection means is arranged to change the selection of a marked item by ignoring angular movement of the rotating input means during a predetermined time period before actuation of the selection means, and said processor means is adapted to generate a selectable number of counts from said angular movement signal by way of a dynamic selection of number of counts for a given angular movement.

12. Method for inputting data in a mobile communication apparatus comprising: generating an angular movement signal upon angular movement of a rotating input means, receiving said angular movement signal by processor means, defining a number of counts for an angular movement of said rotating input means, generating counts in accordance with said angular movement signal, enabling selection of a marked item, and correcting said angular movement signal by disabling count generation during a predetermined time period before actuation of the selection means, wherein said generating of counts includes a dynamic selection of number of counts for a given angular movement.

13. Method for inputting data according to claim 12, wherein defining said number of counts comprises receiving number data from an application executed by said mobile communication apparatus, or receiving number data from user interaction, or any combination thereof.

14. Method for inputting data according to claim 13, comprising monitoring an angular movement speed of said rotating input means and generating angular movement speed data.

15. Method for inputting data according to claim 14, further comprising receiving said angular movement speed data and translating said angular movement speed into a processing action.

16. Computer program comprising code adapted to perform the following steps when said program is run on a data-processing system:

generating an angular movement signal upon angular movement of a rotating input means, receiving said angular movement signal by processor means, defining a number of counts for a angular movement of said rotating input means, generating counts in accordance with said angular movement signal, enabling selection of a marked item, and correcting said angular movement signal by disabling count generation during a predetermined time period before actuation of the selection, wherein said generating of counts includes a dynamic selection of number of counts for a given angular movement.

17. Computer program according to claim 16, wherein said program is adapted to be used to input data in a mobile communication apparatus.

18. Computer program according to claim 16, wherein said program is executed on a mobile communication apparatus comprising processor means and an interface, said interface comprising a display and a input means, said input means comprising a rotating input means arranged to provide a angular movement signal in accordance with an angular movement of said rotating input means, and said processor means being adapted to generate a selectable number of counts from said angular movement signal.

* * * * *